United States Patent
Woolsey et al.

(10) Patent No.: US 12,389,354 B2
(45) Date of Patent: Aug. 12, 2025

(54) TIME SYNCHRONIZATION ALGORITHM FOR WIRELESS NETWORK ACCESS AND PROPAGATION DELAY MEASUREMENT

(71) Applicant: Trabus, San Diego, CA (US)

(72) Inventors: Nicholas Woolsey, San Diego, CA (US); Roy Franklin Quick, Jr., San Diego, CA (US)

(73) Assignee: PEERCONNECT INC., San Diego, CA (US)

( * ) Notice: Subject to any disclaimer, the term of this patent is extended or adjusted under 35 U.S.C. 154(b) by 415 days.

(21) Appl. No.: 17/888,319

(22) Filed: Aug. 15, 2022

(65) Prior Publication Data

US 2023/0262630 A1    Aug. 17, 2023

Related U.S. Application Data

(60) Provisional application No. 63/310,263, filed on Feb. 15, 2022.

(51) Int. Cl.
*H04W 56/00* (2009.01)
(52) U.S. Cl.
CPC ............................... *H04W 56/0045* (2013.01)
(58) Field of Classification Search
CPC ........... H04W 56/0045; H04W 56/009; H04W 370/35
See application file for complete search history.

(56) References Cited

U.S. PATENT DOCUMENTS

| | | | |
|---|---|---|---|
| 9,882,705 B2 * | 1/2018 | Osagawa | H04L 43/0852 |
| 2002/0126706 A1 * | 9/2002 | Laroia | H04L 7/0334 |
| | | | 370/503 |
| 2010/0020909 A1 * | 1/2010 | Jung | H04J 3/0667 |
| | | | 375/371 |
| 2012/0280714 A1 * | 11/2012 | Silverman | G01S 5/06 |
| | | | 326/93 |
| 2014/0219269 A1 * | 8/2014 | Vleugels | G06F 5/16 |
| | | | 370/350 |
| 2022/0171020 A1 * | 6/2022 | Ryan | G01S 7/285 |

FOREIGN PATENT DOCUMENTS

| | | | |
|---|---|---|---|
| JP | 2007184687 A | * | 7/2007 |
| JP | 2013217754 A | * | 10/2013 |

* cited by examiner

*Primary Examiner* — Khai M Nguyen
(74) *Attorney, Agent, or Firm* — Procopio, Cory, Hargreaves & Savitch LLP

(57) ABSTRACT

Clock synchronization, including: receiving a first message at an uncorrected unit with a propagation delay time, wherein a transmission time of the first message is recorded by a corrected unit; recording an arrival time of the first message by the uncorrected unit; transmitting a second message from the uncorrected unit to the corrected unit after a pre-determined delay, receiving a third message at the uncorrected unit, wherein the third message includes a propagation delay time and the transmission time of the first message recorded by the corrected unit; calculating a clock offset between the corrected unit and the uncorrected unit using the propagation delay time and the transmission time of the first message recorded by the corrected unit; and applying the clock offset to synchronize a clock of the uncorrected unit to a clock of the corrected unit.

20 Claims, 5 Drawing Sheets

TIME SYNCHRONIZATION ALGORITHM FOR WIRELESS NETWORK ACCESS AND PROPAGATION DELAY MEASUREMENT

CROSS-REFERENCE TO RELATED APPLICATIONS

This application claims the benefit of priority under 35 U.S.C. § 119(e) of U.S. Provisional Patent Application No. 63/310,263, filed Feb. 15, 2022, entitled "Time Synchronization Algorithm for Wireless Network Access and Propagation Delay Measurement". The disclosure of the above-referenced application is incorporated herein by reference.

BACKGROUND

Field of the Invention

The embodiments described herein are generally directed to time synchronization, and, more particularly, to time synchronization for wireless network/unit to improve network efficiency.

Description of the Related Art

Since the local time or clock value may be different among the units, synchronizing the local times, or adjusting the clock values, to match at each unit may require wireless signals to be transmitted among the nodes to share the time information. For example, a unit may transmit its clock value to other units via a wireless transmission. Receiving units can adjust their clocks to match the clock value from the transmitting unit. However, propagation delay time needs to be considered to have the clock value at each unit precisely match. The propagation delay time is defined as the time that it takes for a signal to be transmitted between units, and is a function of inter-unit distance and varies between pairs of units.

Wireless networks may require time synchronization to improve network efficiency including but not limited to networks that use time division duplexing (TDD). For TDD networks, time slots are assigned to a unit or set of units to transmit, while requiring other units to not transmit. This inhibits interference that would distort the passing of information between units. Units are required to be synchronized in time to allow for TDD. Further, the preciseness of the time synchronization directly correlates to the efficiency of wireless networks. Thus, guard time periods between adjacent time slots may be required due to the propagation delay time. During a guard time, no units may be allowed to transmit to prevent potential interference between time slots. As propagation delay time varies among unit pairs, a maximum tolerable propagation delay time is enforced, and the guard time must be at least as large as this maximum propagation delay time. Then, the guard time must also account for varying local time among the units of the wireless network. Therefore, the guard time may require to be at least the sum of the largest propagation delay time and the largest clock variation among any unit pair. That is, the guard time must be sufficiently long so the transmit and receive signals do not clash. TDD is thus employed where generally the distance between the transmitter and receiver is small. Accordingly, when the distance between the transmitter and receiver increases, the channel efficiency drops as the guard time then needs to be correspondingly long.

SUMMARY

In one implementation, a method for clock synchronization is disclosed. The method includes: receiving a first message at an uncorrected unit from a corrected unit with a propagation delay time, wherein a transmission time of the first message is recorded by the corrected unit; recording an arrival time of the first message by the uncorrected unit; transmitting a second message from the uncorrected unit to the corrected unit after a pre-determined delay, wherein an arrival time of the second message is recorded by the corrected unit; recording a transmission time of the second message by the uncorrected unit; receiving a third message at the uncorrected unit from the corrected unit, wherein the third message includes a propagation delay time and the transmission time of the first message recorded by the corrected unit, and wherein the propagation delay time is between the corrected unit and the uncorrected unit, and is calculated by the corrected unit using (a) the transmission time of the first message recorded by the corrected unit, (b) the arrival time of the second message recorded by the corrected unit, and (c) the predetermined delay; calculating a clock offset between the corrected unit and the uncorrected unit using the propagation delay time and the transmission time of the first message recorded by the corrected unit; and applying the clock offset to synchronize a clock of the uncorrected unit to a clock of the corrected unit.

In another implementation, a system for clock synchronization between a corrected unit and an uncorrected unit includes an uncorrected clock, a transceiver, a recorder, a processor, and a timing adjuster. The transceiver receives a first message from the corrected unit, which records a transmission time of the first message, the transceiver to transmit a second message to the corrected unit after a pre-determined delay, wherein an arrival time of the second message is recorded by the corrected unit, the transceiver also receives a third message from the corrected unit, wherein the third message includes a propagation delay time and the transmission time of the first message recorded by the corrected unit, and wherein the propagation delay time is between the corrected unit and the uncorrected unit, and is calculated by the corrected unit using (a) the transmission time of the first message recorded by the corrected unit, (b) the arrival time of the second message recorded by the corrected unit, and (c) the predetermined delay. The recorder records an arrival time of the first message and a transmission time of the second message. The processor processes the third message to extract parameters including the propagation delay time and the transmission time of the first message recorded by the corrected unit, and to calculate a clock offset between the corrected unit and the uncorrected unit using the propagation delay time and the transmission time of the first message recorded by the corrected unit. The timing adjuster to apply the clock offset to synchronize the uncorrected clock to a clock of the corrected unit.

In yet another implementation, a non-transitory computer-readable storage medium storing a computer program to synchronize clocks is disclosed. The computer program includes executable instructions that cause a computer to: receive a first message at an uncorrected unit from a corrected unit with a propagation delay time, wherein a transmission time of the first message is recorded by the corrected unit; record an arrival time of the first message by the uncorrected unit; transmit a second message from the uncorrected unit to the corrected unit after a pre-determined delay, wherein an arrival time of the second message is recorded by the corrected unit; record a transmission time of the second message by the uncorrected unit; receive a third message at the uncorrected unit from the corrected unit, wherein the third message includes a propagation delay time and the transmission time of the first message recorded by the corrected unit, and wherein the propagation delay time is between the corrected unit and the uncorrected unit, and is calculated by the corrected unit using (a) the transmission time of the first message recorded by the corrected unit, (b) the arrival time of the second message recorded by the corrected unit, and (c) the predetermined delay; calculate a clock offset between the corrected unit and the uncorrected unit using the propagation delay time and the transmission time of the first message recorded by the corrected unit; and apply the clock offset to synchronize a clock of the uncorrected unit to a clock of the corrected unit.

Other features and advantages should be apparent from the present description which illustrates, by way of example, aspects of the disclosure.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

As described above, guard time periods between adjacent time slots (e.g., in TDD) may be required due to the propagation delay time. During a guard time, no units may be allowed to transmit to prevent potential interference between time slots. As propagation delay time varies among unit pairs, a maximum tolerable propagation delay time is enforced, and the guard time must be at least as large as this maximum propagation delay time. The guard time must also account for varying local time among the units of the wireless network. Thus, the guard time may require to be at least the sum of the largest propagation delay time and the largest clock variation among any conventional unit pair. However, as the guard time increases, the channel efficiency drops accordingly. Therefore, a precise clock synchronization method may be needed to keep the guard time as small as possible.

In one implementation, network access (i.e., a unit's permission to transmit and receive information on the wireless network) is dictated by the unit's distance to other units of the wireless network. If a unit is beyond the distance associated with the maximum tolerable propagation delay time, then a unit uses this information to determine how to interact with the network. This includes but is not limited to the unit ceasing access to the network permanently or for some time interval. Accordingly, the method is designed to be efficient, or reduce the signal transmissions necessary for every unit of a wireless network to synchronize in time and determine network access.

Certain implementations of the present disclosure provide systems, methods, and non-transitory computer-readable media for clock synchronization including correction of propagation delay times. In one implementation, a series of signals is transmitted between two units to resolve the propagation delay time and correct for time synchronization between the units. In another implementation, signals are transmitted among multiple units to resolve the propagation delay time and correct for time synchronization at the units. After reading the below descriptions, it will become apparent how to implement the disclosure in various implementations and applications. Although various implementations of the present disclosure will be described herein, it is understood that these implementations are presented by way of example only, and not limitation. As such, the detailed description of various implementations should not be construed to limit the scope or breadth of the present disclosure.

Figure 1:
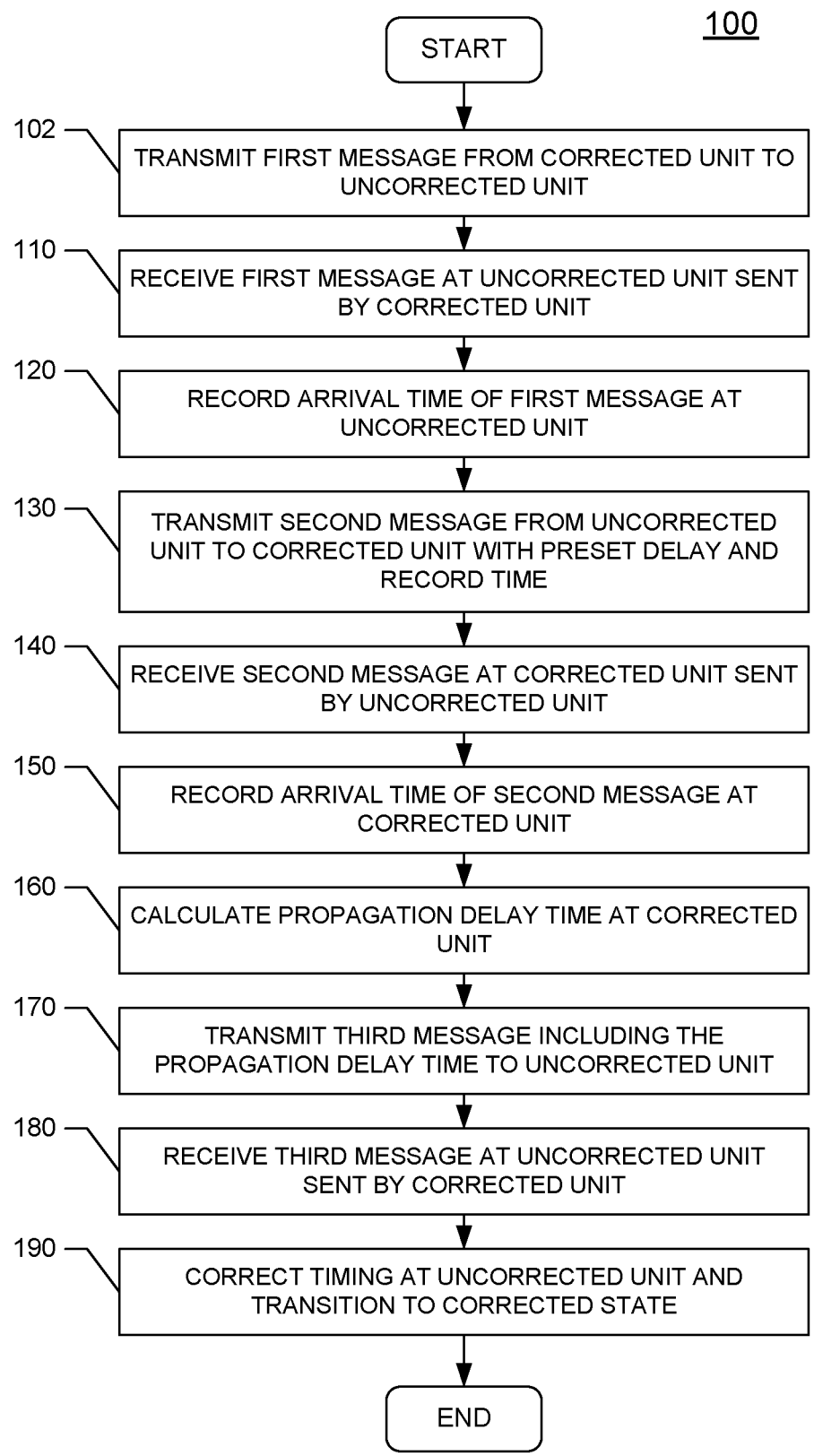
FIG. 1 is a flow diagram of a process for clock synchronization including correction of propagation delay times in accordance with one implementation of the present disclosure.

FIG. 1 is a flow diagram of a process 100 for clock synchronization including correction of propagation delay times in accordance with one implementation of the present disclosure. The illustrated flow diagram of FIG. 1 shows the process 100 for two units to become synchronized in time with a correction for propagation delay time. The first unit is labeled as a corrected unit that is synchronized to a timing source using a correction process, an internal timing source such as crystal and atomic clocks, or other external sources such as global position system (GPS), time broadcast services, and cellular systems. The second unit, labeled as the uncorrected unit, has an unsynchronized time with respect to the corrected unit. Although the illustrated implementation only shows two units, the process 100 may be used as a part of a larger process by which a network of many units become synchronized and corrected to one or multiple timing sources.

In the illustrated implementation of FIG. 1, a first message is transmitted, at step 102, from the corrected unit to the uncorrected unit with the corrected unit recording the transmission time of the first message ($t_{1\_trans}$). The first message is received, at step 110, and the arrival time ($t_{1\_arr}$) of the first message is recorded by the uncorrected unit, at step 120. In one implementation, the arrival time ($t_{1\_arr} = t_{1\_trans} + t_{p\_delay}$) of the first message is equal to the transmission time ($t_{1\_trans}$) plus the propagation delay time ($t_{p\_delay}$). Thus, when the propagation delay time ($t_{p\_delay}$) is subtracted from the arrival time ($t_{1\_arr}$) of the first message recorded by the uncorrected unit (i.e., $t_{1\_arr} - t_{p\_delay}$), the result is the transmission time of the first message as calculated by the uncorrected unit ($t_{1\_trans\_u}$). Therefore, the clock offset ($t_{offset}$) between the corrected unit and the uncorrected unit is the difference (i.e., $t_{offset} = t_{1\_trans\_u} - t_{1\_trans}$) between $t_{1\_trans\_u}$ and $t_{1\_trans}$. However, it should be noted that neither the propagation delay time ($t_{p\_delay}$) nor the clock offset ($t_{offset}$) can be calculated yet until after more messages are transmitted and received between the two units, because the transmission time of the first message ($t_{1\_trans}$) as recorded by the corrected unit is not known to the uncorrected unit.

In the illustrated implementation of FIG. 1, the uncorrected unit transmits a second message to the corrected unit, at step 130, after a pre-determined delay ($\Delta$), and the transmission time ($t_{2\_trans}$) of the second message is recorded by the uncorrected unit. In one implementation, the pre-determined delay ($\Delta$) is transmitted in the second message from the uncorrected unit to the corrected unit. Thus, in this case, the transmission time ($t_{2\_trans}=t_{1\_arr}+\Delta$) of the second message is equal to the arrival time ($t_{1\_arr}$) of the first message plus the pre-determined delay ($\Delta$). The second message is then received, at step 140, and the arrival time ($t_{2\_arr}$) of the second message is recorded by the corrected unit, at step 150. In one implementation, the arrival time ($t_{2\_arr}=t_{2\_trans}+t_{p\_delay}$) of the second message is equal to the transmission time ($t_{2\_trans}$) of the second message as recorded by the uncorrected unit plus the propagation delay time ($t_{p\_delay}$), as follows:

$$t_{2\_arr}=t_{2\_trans}+t_{p\_delay}. \quad [1]$$

Thus, when the transmission time ($t_{2\_trans}$) of the second message is replaced with the arrival time ($t_{1\_arr}$) of the first message plus the pre-determined delay ($\Delta$) in equation [1] shown above, the arrival time ($t_{2\_arr}$) of the second message is equal to:

$$t_{2\_arr}=(t_{1\_arr}+\Delta)+t_{p\_delay}. \quad [2]$$

Further, when the arrival time ($t_{1\_arr}=t_{1\_trans}+t_{p\_delay}$) of the first message is replaced with the transmission time ($t_{1\_trans}$) plus the propagation delay time ($t_{p\_delay}$) in equation [2] shown above, the arrival time ($t_{2\_arr}$) of the second message is equal to:

$$t_{2\_arr}=((t_{1\_trans}+t_{p\_delay})+\Delta)+t_{p\_delay}=t_{1\_trans}+\Delta+2*t_{p\_delay}. \quad [3]$$

From equation [3], the corrected unit calculates the propagation delay time, at step 160, as follows:

$$t_{p\_delay}=(t_{2\_arr}-t_{1\_trans}-\Delta)/2, \quad [4]$$

wherein parameters $t_{2\_arr}$ and $t_{1\_trans}$ are known to the corrected unit and parameter A is received from the uncorrected unit.

In one implementation, the corrected unit transmits a third message including the propagation delay time ($t_{p\_delay}$) and the transmission time ($t_{1\_trans}$) of the first message as recorded by the corrected unit to the uncorrected unit, at step 170. The uncorrected unit receives the third message, at step 180, and applies timing correction using the received propagation delay time, at step 190. As described above, the application of the timing correction at the uncorrected unit may include subtracting out the propagation delay time ($t_{p\_delay}$) from the arrival time ($t_{1\_arr}$) of the first message recorded by the uncorrected unit to calculate the transmission time of the first message as calculated by the uncorrected unit ($t_{1\_trans\_u}$) as follows:

$$t_{1\_trans\_u}=t_{1\_arr}-t_{p\_delay}. \quad [5]$$

The application of the timing correction at the uncorrected unit may also include calculating the clock offset (toffset) between the corrected unit and the uncorrected unit as follows:

$$t_{offset}=t_{1\_trans\_u}-t_{1\_trans}, \quad [6]$$

wherein $t_{1\_trans\_u}$=the transmission time of the first message as calculated by the uncorrected unit, and wherein $t_{1\_trans}$=the transmission time of the first message as recorded by the corrected unit.

Accordingly, in one implementation, the clock offset ($t_{offset}$) represents the timing correction that needs to be applied at the uncorrected unit. Once the timing correction is applied at the uncorrected unit, at step 190, the uncorrected unit is transitioned into a corrected state. In one implementation, the previously uncorrected unit is now labelled as a "corrected unit" and is used to correct other uncorrected units. In another implementation, each transmission of message includes at least one offset that is random, pseudo-random or fixed to some value that may or may not be unique to each unit.

Figure 2A:
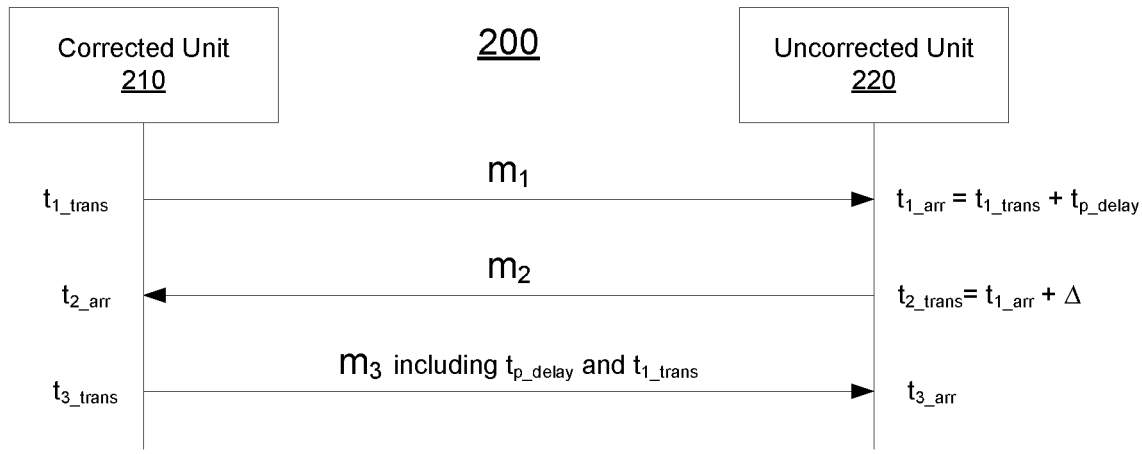
FIG. 2A is a timing diagram showing the messages (e.g., $m_1$, $m_2$, $m_3$) being transmitted and received between the corrected unit and the uncorrected unit as illustrated in FIG. 1 and described in the corresponding detailed description of FIG. 1.

FIG. 2A is a timing diagram 200 showing the messages (e.g., $m_1$, $m_2$, $m_3$) being transmitted and received between the corrected unit 210 and the uncorrected unit 220 as illustrated in FIG. 1 and described in the corresponding detailed description of FIG. 1. In the illustrated implementation of FIG. 2A, the first message ($m_1$) is transmitted from the corrected unit 210 to the uncorrected unit 220 with the corrected unit 210 recording the transmission time of the first message ($t_{1\_trans}$). The first message ($m_1$) is received and the arrival time ($t_{1\_arr}$) of the first message is recorded by the uncorrected unit 220. In one implementation, the arrival time ($t_{1\_arr}=t_{1\_trans}+t_{p\_delay}$) of the first message ($m_1$) is equal to the transmission time ($t_{1\_trans}$) plus the propagation delay time ($t_{p\_delay}$). The uncorrected unit 220 then transmits the second message ($m_2$) to the corrected unit 210 after a pre-determined delay ($\Delta$), and the transmission time ($t_{2\_trans}$) of the second message ($m_2$) is recorded by the uncorrected unit 220. In one implementation, the pre-determined delay ($\Delta$) is transmitted in the second message ($m_2$) from the uncorrected unit 220 to the corrected unit 210. Thus, in this case, the transmission time ($t_{2\_trans}=t_{1\_arr}+\Delta$) of the second message ($m_2$) is equal to the arrival time ($t_{1\_arr}$) of the first message ($m_1$) plus the pre-determined delay ($\Delta$). The second message ($m_2$) is then received at the corrected unit 210, and the arrival time ($t_{2\_arr}$) of the second message ($m_2$) is recorded by the corrected unit 210. In one implementation, the arrival time ($t_{2\_arr}=t_{2\_trans}+t_{p\_delay}$) of the second message ($m_2$) is equal to the transmission time ($t_{2\_trans}$) of the second message ($m_2$) as recorded by the uncorrected unit 220 plus the propagation delay time ($t_{p\_delay}$). In one implementation, the corrected unit 210 transmits the third message ($m_3$) including the propagation delay time ($t_{p\_delay}$) and the transmission time ($t_{1\_trans}$) of the first message ($m_1$) as recorded by the corrected unit 210 to the uncorrected unit 220. The uncorrected unit 220 receives the third message ($m_3$), and applies timing correction using the received propagation delay time.

In one implementation, the above-described clock synchronization process 100 illustrated in FIG. 1 and described in the corresponding detailed description of FIG. 1 is part of a larger process by which a network of multiple units become synchronized and corrected to one or multiple timing sources.

Figure 2B:
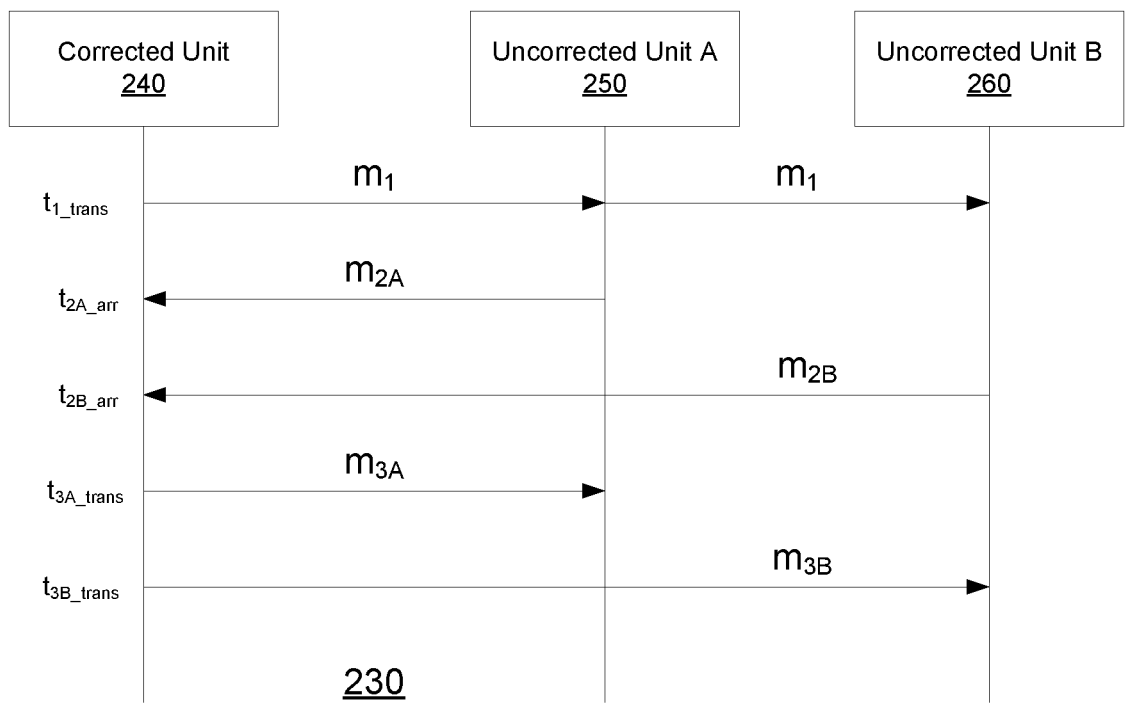
FIG. 2B is an example timing diagram showing a network of two uncorrected units being synchronized and corrected to one timing source.

FIG. 2B is an example timing diagram 230 showing a network of two uncorrected units 250, 260 being synchronized and corrected to one timing source 240. In the example implementation of FIG. 2B, the timing diagram 230 shows the messages (e.g., $m_1$, $m_{2A}$, $m_{2B}$, $m_{3A}$, $m_{3B}$) being transmitted and received among a corrected unit 240 and uncorrected units 250, 260. In the illustrated implementation of FIG. 2B, a first message ($m_1$) is transmitted from the corrected unit 240 to the uncorrected units 250, 260 with the corrected unit 240 recording the transmission time of the first message ($t_{1\_trans}$). The first message ($m_1$) is received by each of the uncorrected units 250, 260. The first message ($m_1$) is received by the uncorrected unit 250 and the arrival time ($t_{1A\_arr}$) of the first message is recorded by the uncorrected unit 250. In one implementation, the arrival time ($t_{1A\_arr}=t_{1\_trans}+t_{p\_delay\_A}$) of the first message ($m_1$) is equal to the transmission time ($t_{1\_trans}$) plus the propagation delay time measure at uncorrected unit 250 ($t_{p\_delay\_A}$). The first message ($m_1$) is also received by the uncorrected unit 260 and the arrival time ($t_{1B\_arr}$) of the first message is recorded by the uncorrected unit 260. In one implementation, the arrival time ($t_{1B\_arr}=t_{1\_trans}+t_{p\_delay\_B}$) of the first message ($m_1$) is equal to the transmission time ($t_{1\_trans}$) plus the propagation delay time measure at uncorrected unit 260 ($t_{p\_delay\_B}$).

The uncorrected unit 250 then transmits a second message ($m_{2A}$) to the corrected unit 240 after a first pre-determined delay ($\Delta_A$), while the uncorrected unit 260 transmits a third message ($m_{2B}$) to the corrected unit 240 after a second pre-determined delay ($\Delta_B$). In one implementation, the first pre-determined delay ($\Delta_A$) and the second pre-determined delay ($\Delta_B$) are equal. In another implementation, the first pre-determined delay ($\Delta_A$) and the second pre-determined delay ($\Delta_B$) are different. The second message ($m_{2A}$) is received at the corrected unit 240, and the arrival time ($t_{2A\_arr}$) of the second message ($m_{2A}$) is recorded by the corrected unit 240. The third message ($m_{2B}$) is received at the corrected unit 240, and the arrival time ($t_{2B\_arr}$) of the third message ($m_{2B}$) is recorded by the corrected unit 240. In one implementation, the arrival time ($t_{2A\_arr}=t_{2A\_trans}+t_{p\_delay\_B}$) of the second message ($m_2$) is equal to the transmission time ($t_{2A\_trans}$) of the second message ($m_2$) as recorded by the uncorrected unit 250 plus the propagation delay time measure at uncorrected unit 250 ($t_{p\_delay\_A}$). In another implementation, the arrival time ($t_{2B\_arr}=t_{2B\_trans}+t_{p\_delay\_B}$) of the third message ($m_3$) is equal to the transmission time ($t_{2B\_trans}$) of the third message ($m_3$) as recorded by the uncorrected unit 260 plus the propagation delay time measure at uncorrected unit 260 ($t_{p\_delay\_B}$).

In one implementation, the corrected unit 240 transmits a fourth message ($m_{3A}$) including the propagation delay time as recorded by the uncorrected unit 250 ($t_{p\_delay\_A}$) and the transmission time ($t_{1\_trans}$) of the first message ($m_1$) as recorded by the corrected unit 240 to the uncorrected unit 250. The uncorrected unit 250 receives the fourth message ($m_{3A}$), and applies timing correction using the received propagation delay time ($t_{p\_delay\_A}$). In another implementation, the corrected unit 240 transmits a fifth message ($m_{3B}$) including the propagation delay time as recorded by the uncorrected unit 260 ($t_{p\_delay\_B}$) and the transmission time ($t_{1\_trans}$) of the first message ($m_1$) as recorded by the corrected unit 240 to the uncorrected unit 260. The uncorrected unit 260 receives the fifth message ($m_{3B}$), and applies timing correction using the received propagation delay time ($t_{p\_delay\_B}$).

The example implementations shown in FIGS. 1, 2A, and 2B can be extended to a network of multiple units being synchronized and corrected to one or more timing sources. The above-described implementations can be modified by any person skilled in the art to make or use the present disclosure to provide other structural variations in the wireless network to improve time synchronization for network efficiency, especially for TDD networks.

For example, in one implementation, the clocks of the units in a network can be corrected or not corrected for the propagation delay time, wherein the objective is to synchronize the clocks of all units, starting with one corrected unit. In this implementation, one unit is configured as a base timing source that is always in the corrected state. In one implementation, the base timing source is pre-provisioned. In another implementation, the units within the network determine the base timing source using their identifiers, which may be hardware identifiers or other pre-provisioned identifiers. In another implementation, the mechanism for deciding which unit(s) to select as the base timing source is to select the unit with the highest-rank identifier, wherein the rank may be in numerical order, alphabetical order or some other order including pseudo-random order, such as a hash function of the identifier, possibly with other data also used as input, such as time, network name, operational parameters. In another implementation, the unit identifiers are included in the "first message" to or from each other. In one implementation, the correction value is used to calculate the distance (d) from the nearest corrected unit. In a further implementation, a unit adjusts its output power in proportion to the calculated distance (e.g., proportional to the square of the distance ($d^2$)). In a further implementation, the correction value is used to determine the distance from the base timing source. Further, in this implementation, following additional implementations are contemplated: (a) a unit does not enter the network if the distance exceeds a pre-determined limit; (b) the limit is calculated to be c (i.e., the speed of light) divided by the network guard time; (c) timeouts are associated with retrying to enter the network. In a further implementation, a unit uses an alternative protocol or alternative frequency channel if the distance exceeds a limit.

In a particular implementation, a method of clock synchronization is disclosed. The method includes: receiving a first message at an uncorrected unit from a corrected unit with a propagation delay time, wherein a transmission time of the first message is recorded by the corrected unit; recording an arrival time of the first message by the uncorrected unit; transmitting a second message from the uncorrected unit to the corrected unit after a pre-determined delay, wherein an arrival time of the second message is recorded by the corrected unit; recording a transmission time of the second message by the uncorrected unit; receiving a third message at the uncorrected unit from the corrected unit, wherein the third message includes a propagation delay time and the transmission time of the first message recorded by the corrected unit, and wherein the propagation delay time is between the corrected unit and the uncorrected unit, and is calculated by the corrected unit using (a) the transmission time of the first message recorded by the corrected unit, (b) the arrival time of the second message recorded by the corrected unit, and (c) the predetermined delay; calculating a clock offset between the corrected unit and the uncorrected unit using the propagation delay time and the transmission time of the first message recorded by the corrected unit; and applying the clock offset to synchronize a clock of the uncorrected unit to a clock of the corrected unit.

In one implementation, the clock of the corrected unit is synchronized to a timing source using one of correction process or an internal timing source, and the clock of the uncorrected unit is unsynchronized with respect to the clock of the corrected unit. In one implementation, the method further includes calculating a transmission time of the first message recorded by the uncorrected unit as the arrival time of the first message recorded by the uncorrected unit minus the propagation delay time. In one implementation, the method further includes calculating the clock offset between the clock of the corrected unit and the clock of the uncorrected unit as equal to the transmission time of the first message recorded by the uncorrected unit minus the transmission time of the first message recorded by the corrected unit. In one implementation, the second message received from the uncorrected unit includes the predetermined delay. In one implementation, the arrival time of the second message as recorded by the corrected unit is equal to the transmission time of the second message recorded by the uncorrected unit minus the propagation delay time. In one implementation, the propagation delay time is equal to a total value divided by two, wherein the total value is equal to the arrival time of the second message recorded by the corrected unit minus the transmission time of the first message recorded by the corrected unit minus the predetermined delay. In one implementation, the method further includes transitioning the uncorrected unit to a second corrected unit, after the clock offset is applied to synchronize the clock of the uncorrected unit to the clock of the corrected unit. In one implementation, the method further includes transitioning the uncorrected unit to a correcting unit, after calculating the clock offset between the corrected unit and the uncorrected unit; and transitioning the correcting unit to a second corrected unit, after the clock offset is applied to synchronize the clock of the uncorrected unit to the clock of the corrected unit. Additional implementations for clock synchronization are disclosed in the Appendix which includes descriptions of FIG. 5.

Figure 3:
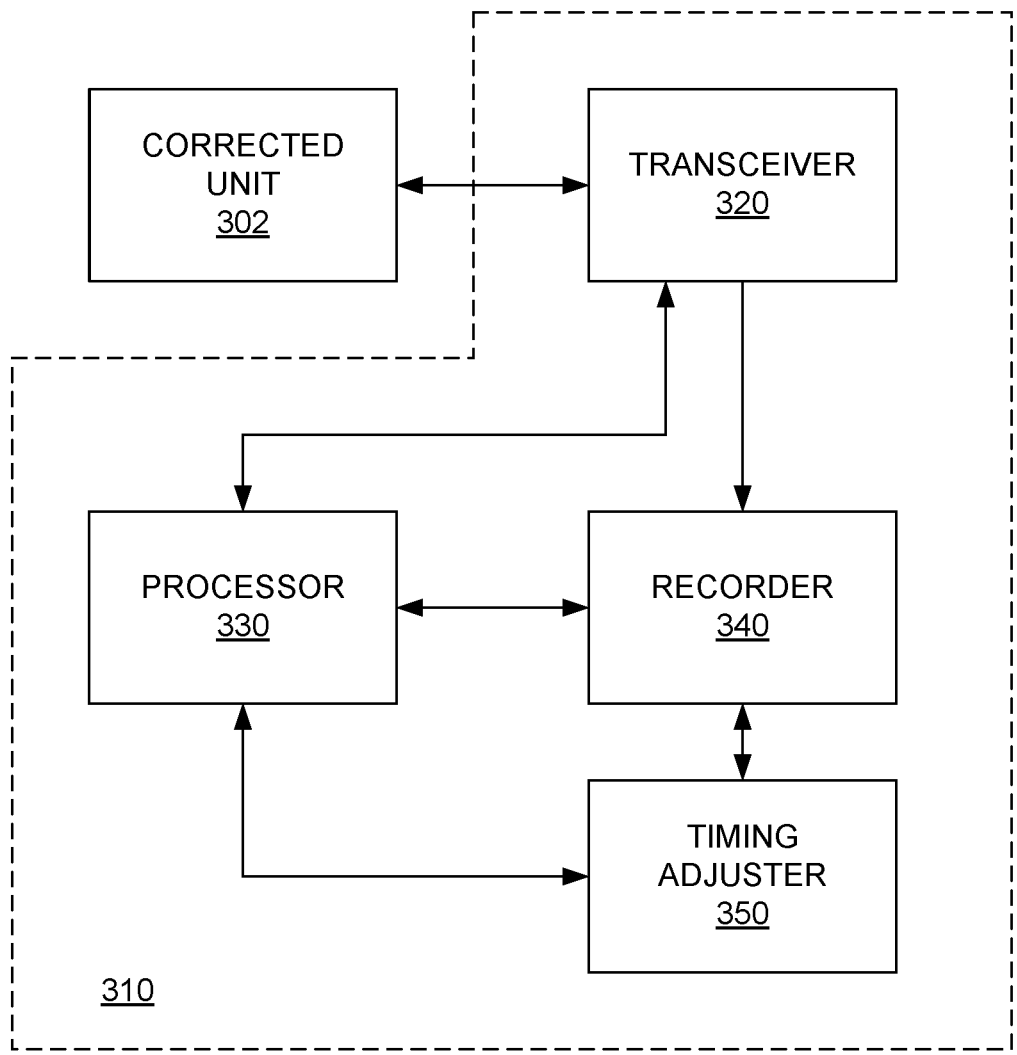
FIG. 3 is a block diagram of a system for clock synchronization in accordance with one implementation of the present disclosure.

FIG. 3 is a block diagram of a system 300 for clock synchronization in accordance with one implementation of the present disclosure. The block diagram of FIG. 3 shows the system 300 for two units 302, 310 to become synchronized in time with a correction for propagation delay time. The first unit 302 is labeled as a corrected unit that is synchronized to a timing source using a correction process, an internal timing source such as crystal and atomic clocks, or other external sources such as global position system (GPS), time broadcast services, and cellular systems. The second unit 310 (e.g., an uncorrected unit) has an unsynchronized time with respect to the corrected unit 302. Although the illustrated implementation only shows two units, the system 300 may be used as a part of a larger structure by which a network of many units become synchronized and corrected to one or multiple timing sources. In the illustrated implementation of FIG. 3, the uncorrected unit 310 includes a transceiver 320, a processor 330, a recorder 340, and a timing adjuster 350. In one implementation, blocks 302, 310, 320, 330, 340, and 350 of the system 300 are configured entirely with hardware including one or more digital signal processors (DSPs), general purpose microprocessors, application specific integrated circuits (ASICs), field programmable logic arrays (FPGAs), or other equivalent integrated or discrete logic circuitry.

In one implementation, the transceiver 320 receives a first message from the corrected unit 302, which records the transmission time of the first message ($t_{1\_trans}$). The transceiver 320 receives and directs the first message to the recorder 340 which records the arrival time ($t_{1\_arr}$) of the first message. In one implementation, the arrival time ($t_{1\_arr} = t_{1\_trans} + t_{p\_delay}$) of the first message is equal to the transmission time ($t_{1\_trans}$) plus the propagation delay time ($t_{p\_delay}$). Thus, when the propagation delay time ($t_{p\_delay}$) is subtracted from the arrival time ($t_{1\_arr}$) of the first message recorded by the recorder 340 (i.e., $t_{1\_arr} - t_{p\_delay}$), the result is the transmission time of the first message as calculated by the uncorrected unit 310 ($t_{1\_trans\_u}$). Therefore, the clock offset ($t_{offset}$) between the corrected unit 302 and the uncorrected unit 310 is the difference (i.e., $t_{offset} = t_{1\_trans\_u} - t_{1\_trans}$) between $t_{1\_trans\_u}$ and $t_{1\_trans}$. However, it should be noted that neither the propagation delay time ($t_{p\_delay}$) nor the clock offset ($t_{offset}$) can be calculated yet until after more messages are transmitted and received between the two units 302, 310, because the transmission time of the first message ($t_{1\_trans}$) as recorded by the corrected unit 302 is not known to the uncorrected unit 310.

In the illustrated implementation of FIG. 3, the transceiver 320 transmits a second message to the corrected unit 302 after a pre-determined delay ($\Delta$), and the transmission time ($t_{2\_trans}$) of the second message is recorded by the recorder 340. In one implementation, the pre-determined delay ($\Delta$) is transmitted in the second message from the transceiver 320 to the corrected unit 302. Thus, in this case, the processor 330 calculates the transmission time ($t_{2\_trans} = t_{1\_arr} + \Delta$) of the second message as being equal to the arrival time ($t_{1\_arr}$) of the first message plus the pre-determined delay ($\Delta$). The second message is then received and the arrival time ($t_{2\_arr}$) of the second message is recorded by the corrected unit 302. In one implementation, the arrival time ($t_{2\_arr} = t_{2\_trans} + t_{p\_delay}$) of the second message is equal to the transmission time ($t_{2\_trans}$) of the second message as recorded by the recorder 340 plus the propagation delay time ($t_{p\_delay}$) (see Equation [1] above). Thus, when the transmission time ($t_{2\_trans}$) of the second message is replaced with the arrival time ($t_{1\_arr}$) of the first message plus the pre-determined delay ($\Delta$) shown in equation [1], the arrival time ($t_{2\_arr}$) of the second message is calculated to be as shown in Equation [2] ($t_{2\_arr} = (t_{1\_arr} + \Delta) + t_{p\_delay}$). Further, when the arrival time ($t_{1\_arr} = t_{1\_trans} + t_{p\_delay}$) of the first message is replaced with the transmission time ($t_{1\_trans}$) plus the propagation delay time ($t_{p\_delay}$) in equation [2] shown above, the arrival time ($t_{2\_arr}$) of the second message is as shown in Equation [3] ($t_{2\_arr} = ((t_{1\_trans} + t_{p\_delay}) + \Delta) + t_{p\_delay} = t_{1\_trans} + 2*t_{p\_delay}$). From equation [3], the corrected unit 302 calculates the propagation delay time as shown in Equation [4] ($t_{p\_delay} = t_{2\_arr} - t_{1\_trans} - \Delta)/2$, wherein parameters $t_{2\_arr}$ and $t_{1\_trans}$ are known to the corrected unit 302 and parameter $\Delta$ is received from the transceiver 320.

In one implementation, the corrected unit 302 transmits a third message including the propagation delay time ($t_{p\_delay}$) and the transmission time ($t_{1\_trans}$) of the first message as recorded by the corrected unit 302 to the transceiver 320 of the uncorrected unit 310. The transceiver 320 receives the third message and sends the received message to the processor 330 to process the message to extract parameters including the propagation delay time and the transmission time of the first message. The processor 330 sends the extracted parameters to the timing adjuster 350, and the timing adjuster 350 applies timing correction needed for clock synchronization using the received propagation delay time. As described above, the application of the timing correction at the timing adjuster 350 may include subtracting out the propagation delay time ($t_{p\_delay}$) from the arrival time ($t_{1\_arr}$) of the first message recorded by the recorder 340 to calculate the transmission time of the first message ($t_{1\_trans\_u}$) as shown in Equation [5] ($t_{1\_trans\_u} = t_{1\_arr} - t_{p\_delay}$). The application of the timing correction at the timing adjuster 350 may also include calculating the clock offset ($t_{offset}$) between the corrected unit 302 and the uncorrected unit 310 as shown in Equation [6] ($t_{offset} = t_{1\_trans\_u} - t_{1\_trans}$).

Accordingly, in one implementation, the clock offset (toffset) represents the timing correction that needs to be applied at the uncorrected unit 310. Once the timing correction is applied at the uncorrected unit 310, the uncorrected unit 310 is transitioned into a corrected state. In one implementation, the previously uncorrected unit 310 is now labelled as a "corrected unit" and is used to correct other uncorrected units. In another implementation, each transmission of message includes at least one offset that is random, pseudo-random or fixed to some value that may or may not be unique to each unit.

In a particular implementation, a system for clock synchronization between a corrected unit and an uncorrected unit is disclosed. The uncorrected unit includes: an uncorrected clock; a transceiver to receive a first message from the corrected unit, which records a transmission time of the first message, the transceiver to transmit a second message to the corrected unit after a pre-determined delay, wherein an arrival time of the second message is recorded by the corrected unit, the transceiver to also receive a third message from the corrected unit, wherein the third message includes a propagation delay time and the transmission time of the first message recorded by the corrected unit, and wherein the propagation delay time is between the corrected unit and the uncorrected unit, and is calculated by the corrected unit using (a) the transmission time of the first message recorded by the corrected unit, (b) the arrival time of the second message recorded by the corrected unit, and (c) the predetermined delay; a recorder to record an arrival time of the first message and a transmission time of the second message; a processor to process the third message to extract parameters including the propagation delay time and the transmission time of the first message recorded by the corrected unit, and to calculate a clock offset between the corrected unit and the uncorrected unit using the propagation delay time and the transmission time of the first message recorded by the corrected unit; and a timing adjuster to apply the clock offset to synchronize the uncorrected clock to a clock of the corrected unit.

In one implementation, the uncorrected clock is unsynchronized with respect to the clock of the corrected unit. In one implementation, the processor further calculates a transmission time of the first message recorded by the uncorrected unit as the arrival time of the first message recorded by the uncorrected unit minus the propagation delay time. In one implementation, the processor further calculates the clock offset between the clock of the corrected unit and the uncorrected clock as equal to the transmission time of the first message recorded by the uncorrected unit minus the transmission time of the first message recorded by the corrected unit.

Figure 4A:
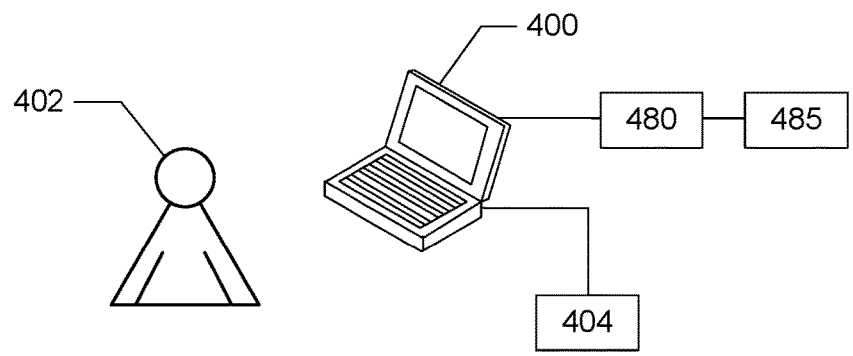
FIG. 4A is a representation of a computer system and a user in accordance with an implementation of the present disclosure.

FIG. 4A is a representation of a computer system 400 and a user 402 in accordance with an implementation of the present disclosure. The user 402 uses the computer system 400 to implement a clock synchronization application 490 for clock synchronization including correction of propagation delay times with respect to the process 100 of FIG. 1 and the system 300 of FIG. 3.

Figure 4B:
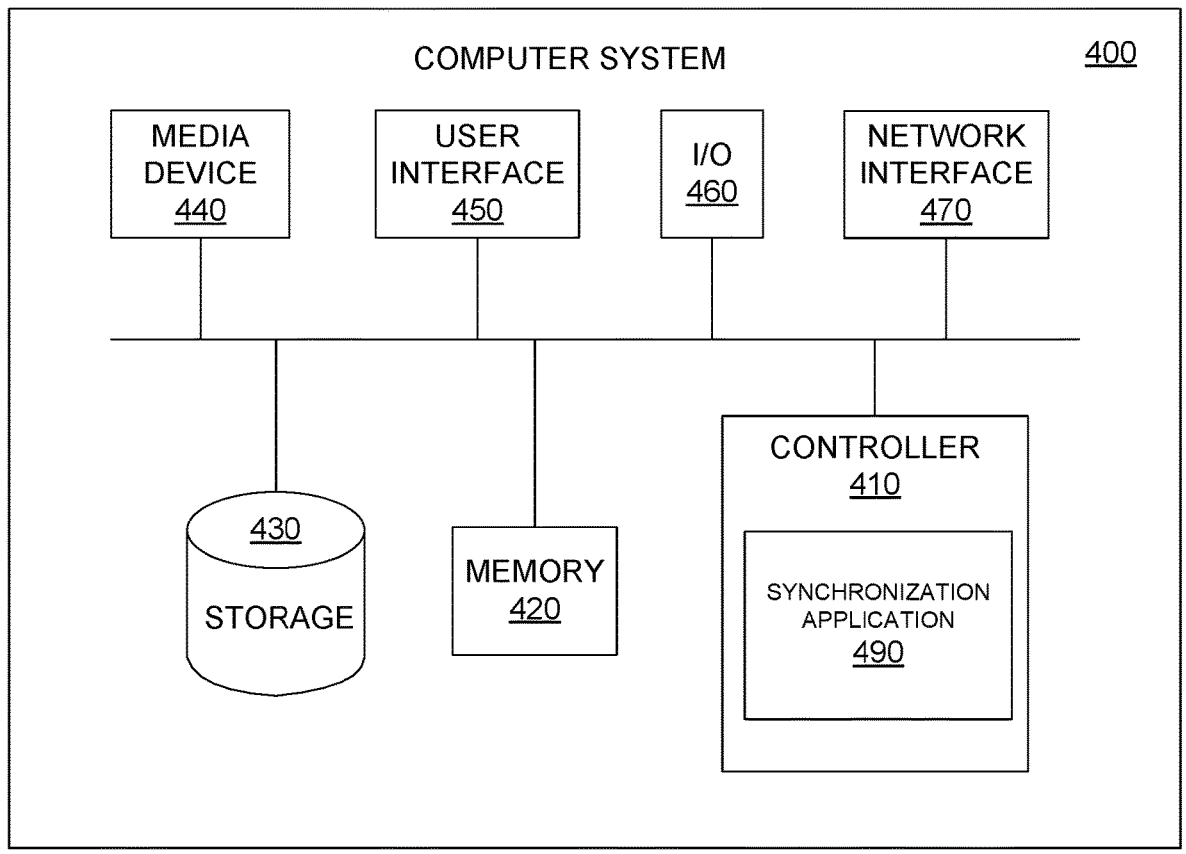
FIG. 4B is a functional block diagram illustrating the computer system hosting the synchronization application in accordance with an implementation of the present disclosure.

The computer system 400 stores and executes the synchronization application 490 of FIG. 4B. In addition, the computer system 400 may be in communication with a software program 404. Software program 404 may include the software code for the synchronization application 490. Software program 404 may be loaded on an external medium such as a CD, DVD, or a storage drive, as will be explained further below.

Furthermore, the computer system 400 may be connected to a network 480. The network 480 can be connected in various different architectures, for example, client-server architecture, a Peer-to-Peer network architecture, or other type of architectures. For example, network 480 can be in communication with a server 485 that coordinates engines and data used within the synchronization application 490. Also, the network can be different types of networks. For example, the network 480 can be the Internet, a Local Area Network or any variations of Local Area Network, a Wide Area Network, a Metropolitan Area Network, an Intranet or Extranet, or a wireless network.

FIG. 4B is a functional block diagram illustrating the computer system 400 hosting the synchronization application 490 in accordance with an implementation of the present disclosure. A controller 410 is a programmable processor and controls the operation of the computer system 400 and its components. The controller 410 loads instructions (e.g., in the form of a computer program) from the memory 420 or an embedded controller memory (not shown) and executes these instructions to control the system, such as to provide the data processing. In its execution, the controller 410 provides the synchronization application 490 with a software system. Alternatively, this service can be implemented as separate hardware components in the controller 410 or the computer system 400.

Memory 420 stores data temporarily for use by the other components of the computer system 400. In one implementation, memory 420 is implemented as RAM. In one implementation, memory 420 also includes long-term or permanent memory, such as flash memory and/or ROM.

Storage 430 stores data either temporarily or for long periods of time for use by the other components of the computer system 400. For example, storage 430 stores data used by the synchronization application 490. In one implementation, storage 430 is a hard disk drive.

The media device 440 receives removable media and reads and/or writes data to the inserted media. In one implementation, for example, the media device 440 is an optical disc drive.

The user interface 450 includes components for accepting user input from the user of the computer system 400 and presenting information to the user 402. In one implementation, the user interface 450 includes a keyboard, a mouse, audio speakers, and a display. In another implementation, the user interface 450 also includes a headset worn by the user and used to collect eye movements as user inputs. The controller 410 uses input from the user 402 to adjust the operation of the computer system 400.

The I/O interface 460 includes one or more I/O ports to connect to corresponding I/O devices, such as external storage or supplemental devices (e.g., a printer or a PDA). In one implementation, the ports of the I/O interface 460 include ports such as: USB ports, PCMCIA ports, serial ports, and/or parallel ports. In another implementation, the I/O interface 460 includes a wireless interface for communication with external devices wirelessly.

The network interface 470 includes a wired and/or wireless network connection, such as an RJ-45 or "Wi-Fi" interface (including, but not limited to 802.11) supporting an Ethernet connection.

The computer system 400 includes additional hardware and software typical of computer systems (e.g., power, cooling, operating system), though these components are not specifically shown in FIG. 4B for simplicity. In other implementations, different configurations of the computer system can be used (e.g., different bus or storage configurations or a multi-processor configuration).

In a particular implementation, a non-transitory computer-readable storage medium storing a computer program to synchronize clocks is disclosed. The computer program includes executable instructions that cause a computer to: receive a first message at an uncorrected unit from a corrected unit with a propagation delay time, wherein a transmission time of the first message is recorded by the corrected unit; record an arrival time of the first message by the uncorrected unit; transmit a second message from the uncorrected unit to the corrected unit after a pre-determined delay, wherein an arrival time of the second message is recorded by the corrected unit; record a transmission time of the second message by the uncorrected unit; receive a third message at the uncorrected unit from the corrected unit, wherein the third message includes a propagation delay time and the transmission time of the first message recorded by the corrected unit, and wherein the propagation delay time is between the corrected unit and the uncorrected unit, and is calculated by the corrected unit using (a) the transmission time of the first message recorded by the corrected unit, (b) the arrival time of the second message recorded by the corrected unit, and (c) the predetermined delay; calculate a clock offset between the corrected unit and the uncorrected unit using the propagation delay time and the transmission time of the first message recorded by the corrected unit; and apply the clock offset to synchronize a clock of the uncorrected unit to a clock of the corrected unit.

In one implementation, clock of the corrected unit is synchronized to a timing source using one of correction process or an internal timing source, and the clock of the uncorrected unit is unsynchronized with respect to the clock of the corrected unit. In one implementation, the non-transitory computer-readable storage medium further includes executable instructions that cause a computer to calculate a transmission time of the first message recorded by the uncorrected unit as the arrival time of the first message recorded by the uncorrected unit minus the propagation delay time. In one implementation, the non-transitory computer-readable storage medium further includes executable instructions that cause a computer to calculate the clock offset between the clock of the corrected unit and the clock of the uncorrected unit as equal to the transmission time of the first message recorded by the uncorrected unit minus the transmission time of the first message recorded by the corrected unit. In one implementation, the second message received from the uncorrected unit includes the predetermined delay. In one implementation, the arrival time of the second message as recorded by the corrected unit is equal to the transmission time of the second message recorded by the uncorrected unit minus the propagation delay time. In one implementation, the propagation delay time is equal to a total value divided by two, wherein the total value is equal to the arrival time of the second message recorded by the corrected unit minus the transmission time of the first message recorded by the corrected unit minus the predetermined delay.

The description herein of the disclosed implementations is provided to enable any person skilled in the art to make or use the present disclosure. Numerous modifications to these implementations would be readily apparent to those skilled in the art, and the principles defined herein can be applied to other implementations without departing from the spirit or scope of the present disclosure. Thus, the present disclosure is not intended to be limited to the implementations shown herein but is to be accorded the widest scope consistent with the principal and novel features disclosed herein. Accordingly, additional variations and implementations are also possible.

All features of each of the above-discussed examples are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

APPENDIX

Figure 5:
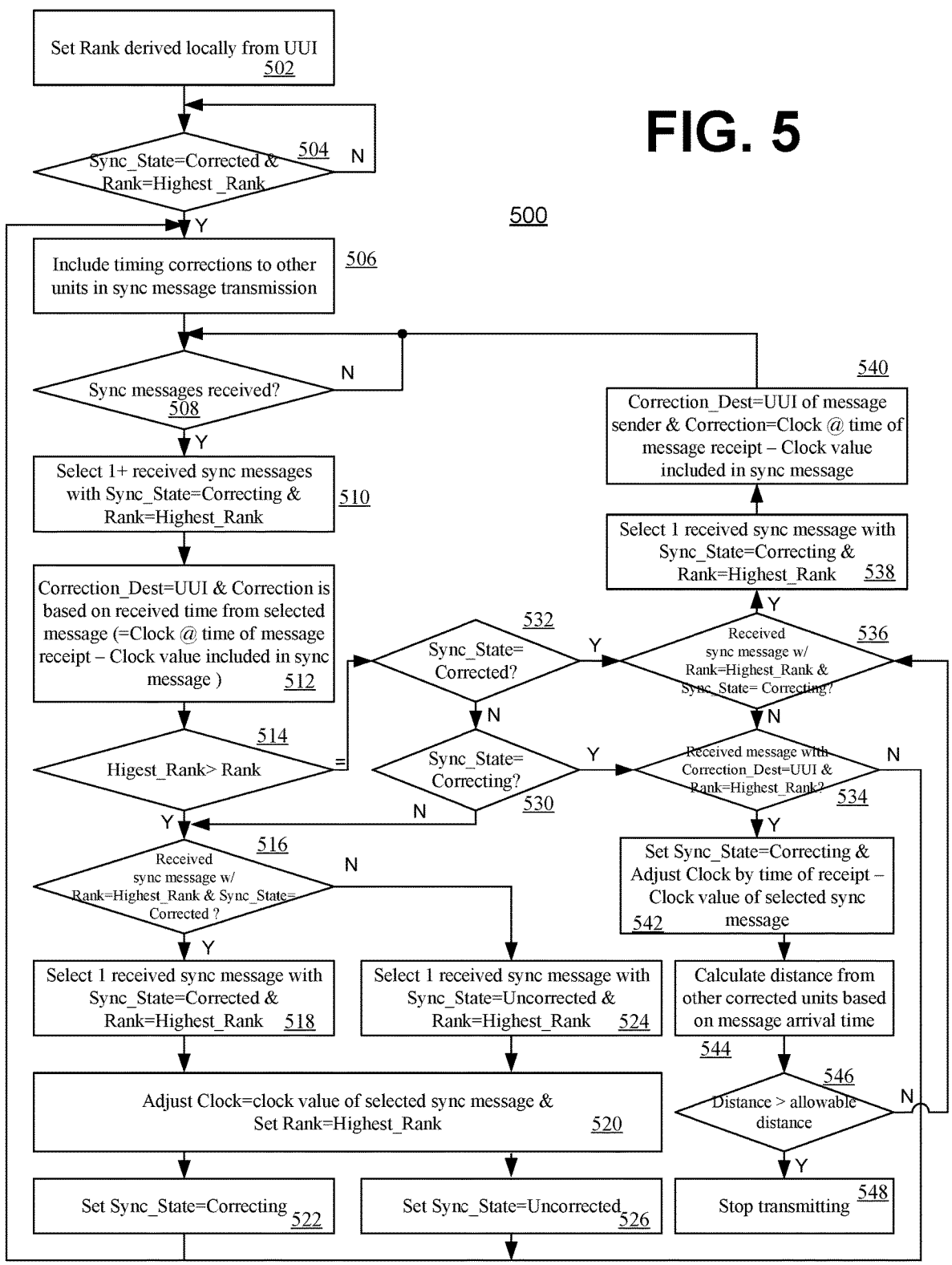
FIG. 5 is a flow diagram of a process for clock synchronization among multiple devices or units including the correction of propagation delay times in accordance with another implementation (e.g., as a particular implementation of the implementation illustrated in FIG. 1) of the present disclosure.

FIG. 5 is a flow diagram of a process 500 for clock synchronization among multiple devices or units including the correction of propagation delay times in accordance with another implementation (e.g., as a particular implementation of the implementation illustrated in FIG. 1) of the present disclosure. The process illustrated in FIG. 5 is run locally through the perspective of a single unit and referenced variables are stored and updated locally unless otherwise noted. Each unit is given an arbitrary unit unique identifier (UUI) using some provisioning process.

In the illustrated implementation of FIG. 5, the units locally track variables including Clock, Rank, Highest_Rank, and Sync_State. Clock is a local time adjusted based on received sync messages. Rank is a function of the UUI of the unit providing the timing adjustments. Highest_Rank is the highest Rank among received and transmitted sync messages within a sync transmission period. Sync_State is Correcting, Uncorrected, or Corrected state. A unit in the Correcting state has set its Clock using the clock value of a sync message from a unit in the Corrected state, but has not received a time correction. A unit in the Uncorrected state has set its Clock using the Clock value of a sync message from a unit that is not in the Corrected state. A unit in the Corrected state either has the highest-ranked UUI among all units that have been received, or has set its Clock using the Clock value and correction value of sync messages from units in the Corrected state.

Initially at each unit, before transmitting or receiving sync messages from other units, the Clock is set using an arbitrary time source, and the Sync_State is to Corrected. It should be noted that the Clock increments with the passing of each pre-determined time interval.

The Rank field is used for units to make local decisions about what unit to use as a timing source. Units sync to the Highest_Rank defined as the highest Rank among received and transmitted sync messages. At initialization, each unit sets its Rank as the Rank derived locally from its UUI 502. Units are provisioned with a comparison method that provides a rank-ordering of the UUIs. In one implementation, the UUI is treated as an unsigned number. In this implementation, UUI A is determined to be ranked higher than UUI B, if the number A is greater than the number B, or alternatively if number A is less than number B. In other implementations, the ranking is done by comparing numbers derived from the UUI by any means such that distinct UUIs have distinct derived numbers.

Units transmit sync messages, or wireless signals, over a sync transmission period. Based on connectivity, some other units receive the transmitted sync messages. In a sync message, the transmitting unit includes its Clock, Rank, Sync_State, and UUI. The sync message may also include timing corrections for other units. Over the sync transmission period, each unit collects all received sync messages and record the received time of each sync message. Then, Highest_Rank is defined as the highest Rank among received sync messages and a unit's own transmitted sync message. In one implementation, if a unit is in the Corrected state and Rank is equal to Highest_Rank 504, the unit includes timing corrections to other units in a later sync message transmission 506.

When the sync messages are received 508, the unit also selects one or more received sync messages with the Correcting state and Rank equal to Highest_Rank 510. Then, the unit may include a Correction_Dest (correction destination) field equal to the UUI from the selected message and a Correction based on the received time of the selected message 512. The Correction is equal to the difference in Clock at the time of message receipt and the Clock value included in the sync message. It should be noted that a unit in the Corrected state stays in the Corrected state and does not change its Rank unless it receives a sync message with a higher Rank. The following describes a process by which a unit changes its Rank and adjust its Clock based on received sync messages.

If Highest_Rank is greater than a unit's current Rank 514, the unit does the following. The unit sets its Rank to be equal to Highest_Rank 518. Of the received sync messages with the Rank equal to Highest_Rank, if there is a sync message that has a Corrected Sync_State 516, the unit selects one of these messages 518. The unit adjusts its Clock to the Clock value of the selected sync message 520. Then, the unit changes its Sync_State to Correcting 522. If there are no sync messages with the Rank equal to Highest_Rank and a Corrected Sync_State 516, the receiving unit selects a sync message with Rank equal to Highest_Rank and Sync_State equal to either Uncorrected 524 or Correcting. The unit adjusts its Clock to the Clock value of the selected sync message 520. Also, the receiving unit adjusts its Sync_State to Uncorrected 526.

Alternatively, if a unit's Rank and Sync_State are equal to Highest_Rank and Uncorrected 516, respectively, the unit does the following. The unit selects a message with Rank and Sync_State equal to Highest_Rank and Corrected 518, respectively, if one such sync message was received 516. If a message was selected, the unit changes its state from Uncorrected to Correcting 522. Otherwise, the unit selects a received message with Rank equal to Highest_Rank and not change its Sync_State 524, 526. In either case, the unit adjusts its Clock to the Clock value of the selected message 520.

Finally, if a unit's Rank and Sync_State are equal to Highest_Rank and Correcting 530 (i.e., N at 532 and Y at 530) or 536, respectively, the unit does the following. The unit selects one received message with Correction_Dest equal to its UUI 534 or 538, if such a message exists. If a message was selected, the unit adjusts its Clock by the difference between the time of receipt and the Clock value of the selected sync message 540 or 542. Then, the unit changes its Sync_State to Correcting 542. If a message was not selected, the unit does not adjust its Clock and its Sync_State remains Correcting.

Once a unit is in the Corrected Sync_State, it uses the receipt time of the received sync messages to resolve propagation delay time to other units in the Corrected Sync_State. The propagation delay time is equal to the difference of the received message time 544 (accounting for clock correction) and the Clock value included in the received sync message 542. If the propagation delay time is greater than the allowed propagation delay time 546, the unit decides how to interact with the next. For example, as shown in FIG. 5, a unit may exclude itself from the network and not send data messages on the network 548. Alternatively include but are not limited to the unit not transmitting for some time interval or the unit accessing the network via other channels. Otherwise, if a unit is within the tolerable distance of other corrected units 546, the unit is included in the network and may transmit and receive data messages.

In an alternative implementation designed for clock synchronization including the correction of propagation delay times, a sync message includes the unit's Sync_State which has three possible values: Correcting, Uncorrected, and Corrected. This allows for units to only send corrections to units in the correcting state. However, since there are three possible states, this requires more than one bit of the sync message. Alternatively, a unit may only use one bit by having two state values: Corrected and Uncorrected. In this implementation, Corrected units send corrections to Uncorrected units. However, Uncorrected units only adjust their clock using a correction if they have previously received a sync message from a Corrected unit. An Uncorrected unit tracks whether it has previously received a sync message from a Corrected unit using variable "Is_Correcting". While "Is_Correcting" is not transmitted in sync messages, a unit uses additional variable Is_Correcting locally to only execute corrections under correct conditions.

It should be noted that corrections are based on the arrival time and clock of a sync message. The correction assumes that a unit has previously synchronized to the arrival time of a corrected unit, in which case, an accurate correction can be computed.

There are other use cases and advantages of using this technique. Propagation delay time is directly correlated to inter-unit distance that is a useful metric for some networks. For example, inter-unit distance can be used to locate position or for navigation purposes. For tactical networks, identifying inter-unit distance can be used to make precise formations with the units.

Also, as mentioned previously, for TDD networks, guard time must accommodate the sum of the inter-unit propagation delay time and timing offsets. Note that, in unit-to-unit time synchronization without propagation delay time correction, units' local clocks is off by at least the propagation delay time. This means that the sum of the clock offset and propagation delay time is double the propagation delay time. With the proposed time synchronization method, the inter-unit clock differences can be much less than the propagation delay time. This effectively reduces the required guard time by half, ultimately increasing the spectral efficiency of a TDD network.

The invention claimed is:

1. A method of clock synchronization, the method comprising:
   receiving a first message at an uncorrected unit from a corrected unit with a propagation delay time,
   wherein a transmission time of the first message is recorded by the corrected unit;
   recording an arrival time of the first message by the uncorrected unit;
   transmitting a second message from the uncorrected unit to the corrected unit after a pre-determined delay,
   wherein an arrival time of the second message is recorded by the corrected unit;
   recording a transmission time of the second message by the uncorrected unit;
   receiving a third message at the uncorrected unit from the corrected unit,
   wherein the third message includes a propagation delay time and the transmission time of the first message recorded by the corrected unit, and
   wherein the propagation delay time is between the corrected unit and the uncorrected unit, and is calculated by the corrected unit using (a) the transmission time of the first message recorded by the corrected unit, (b) the arrival time of the second message recorded by the corrected unit, and (c) the predetermined delay;

calculating a clock offset between the corrected unit and the uncorrected unit using the propagation delay time and the transmission time of the first message recorded by the corrected unit; and applying the clock offset to synchronize a clock of the uncorrected unit to a clock of the corrected unit.

2. The method of claim 1, wherein the clock of the corrected unit is synchronized to a timing source using one of correction process or an internal timing source, and the clock of the uncorrected unit is unsynchronized with respect to the clock of the corrected unit.

3. The method of claim 1, further comprising calculating a transmission time of the first message recorded by the uncorrected unit as the arrival time of the first message recorded by the uncorrected unit minus the propagation delay time.

4. The method of claim 3, further comprising
calculating the clock offset between the clock of the corrected unit and the clock of the uncorrected unit as equal to the transmission time of the first message recorded by the uncorrected unit minus the transmission time of the first message recorded by the corrected unit.

5. The method of claim 1, wherein the second message received from the uncorrected unit includes the predetermined delay.

6. The method of claim 1, wherein the arrival time of the second message as recorded by the corrected unit is equal to the transmission time of the second message recorded by the uncorrected unit minus the propagation delay time.

7. The method of claim 1, wherein the propagation delay time is equal to a total value divided by two, wherein the total value is equal to the arrival time of the second message recorded by the corrected unit minus the transmission time of the first message recorded by the corrected unit minus the predetermined delay.

8. The method of claim 1, further comprising
transitioning the uncorrected unit to a second corrected unit, after the clock offset is applied to synchronize the clock of the uncorrected unit to the clock of the corrected unit.

9. The method of claim 1, further comprising:
transitioning the uncorrected unit to a correcting unit, after calculating the clock offset between the corrected unit and the uncorrected unit; and
transitioning the correcting unit to a second corrected unit, after the clock offset is applied to synchronize the clock of the uncorrected unit to the clock of the corrected unit.

10. A system for clock synchronization between a corrected unit and an uncorrected unit, the uncorrected unit comprising:
an uncorrected clock;
a transceiver to receive a first message from the corrected unit, which records a transmission time of the first message, the transceiver to transmit a second message to the corrected unit after a pre-determined delay, wherein an arrival time of the second message is recorded by the corrected unit,
the transceiver to also receive a third message from the corrected unit, wherein the third message includes a propagation delay time and the transmission time of the first message recorded by the corrected unit, and
wherein the propagation delay time is between the corrected unit and the uncorrected unit, and is calculated by the corrected unit using (a) the transmission time of the first message recorded by the corrected unit, (b) the arrival time of the second message recorded by the corrected unit, and (c) the predetermined delay;
a recorder to record an arrival time of the first message and a transmission time of the second message;
a processor to process the third message to extract parameters including the propagation delay time and the transmission time of the first message recorded by the corrected unit, and to calculate a clock offset between the corrected unit and the uncorrected unit using the propagation delay time and the transmission time of the first message recorded by the corrected unit; and
a timing adjuster to apply the clock offset to synchronize the uncorrected clock to a clock of the corrected unit.

11. The system of claim 10, wherein the uncorrected clock is unsynchronized with respect to the clock of the corrected unit.

12. The system of claim 10, wherein the processor further calculates a transmission time of the first message recorded by the uncorrected unit as the arrival time of the first message recorded by the uncorrected unit minus the propagation delay time.

13. The system of claim 12, wherein the processor further calculates the clock offset between the clock of the corrected unit and the uncorrected clock as equal to the transmission time of the first message recorded by the uncorrected unit minus the transmission time of the first message recorded by the corrected unit.

14. A non-transitory computer-readable storage medium storing a computer program to synchronize clocks, the computer program comprising executable instructions that cause a computer to:
receive a first message at an uncorrected unit from a corrected unit with a propagation delay time, wherein a transmission time of the first message is recorded by the corrected unit;
record an arrival time of the first message by the uncorrected unit;
transmit a second message from the uncorrected unit to the corrected unit after a pre- determined delay, wherein an arrival time of the second message is recorded by the corrected unit;
record a transmission time of the second message by the uncorrected unit;
receive a third message at the uncorrected unit from the corrected unit,
wherein the third message includes a propagation delay time and the transmission time of the first message recorded by the corrected unit, and
wherein the propagation delay time is between the corrected unit and the uncorrected unit, and is calculated by the corrected unit using (a) the transmission time of the first message recorded by the corrected unit, (b) the arrival time of the second message recorded by the corrected unit, and (c) the predetermined delay;
calculate a clock offset between the corrected unit and the uncorrected unit using the propagation delay time and the transmission time of the first message recorded by the corrected unit; and
apply the clock offset to synchronize a clock of the uncorrected unit to a clock of the corrected unit.

15. The non-transitory computer-readable storage medium of claim 14, wherein the clock of the corrected unit is synchronized to a timing source using one of correction process or an internal timing source, and the clock of the uncorrected unit is unsynchronized with respect to the clock of the corrected unit.

16. The non-transitory computer-readable storage medium of claim 14, further comprising executable instructions that cause a computer to
calculate a transmission time of the first message recorded by the uncorrected unit as the arrival time of the first message recorded by the uncorrected unit minus the propagation delay time.

17. The non-transitory computer-readable storage medium of claim 16, further comprising executable instructions that cause a computer to
calculate the clock offset between the clock of the corrected unit and the clock of the uncorrected unit as equal to the transmission time of the first message recorded by the uncorrected unit minus the transmission time of the first message recorded by the corrected unit.

18. The non-transitory computer-readable storage medium of claim 14, wherein the second message received from the uncorrected unit includes the predetermined delay.

19. The non-transitory computer-readable storage medium of claim 14, wherein the arrival time of the second message as recorded by the corrected unit is equal to the transmission time of the second message recorded by the uncorrected unit minus the propagation delay time.

20. The non-transitory computer-readable storage medium of claim 14, wherein the propagation delay time is equal to a total value divided by two, wherein the total value is equal to the arrival time of the second message recorded by the corrected unit minus the transmission time of the first message recorded by the corrected unit minus the predetermined delay.

\* \* \* \* \*